J. W. HARRIS.
HARROW.
APPLICATION FILED MAR. 20, 1918.
1,383,942.
Patented July 5, 1921.
2 SHEETS—SHEET 2.
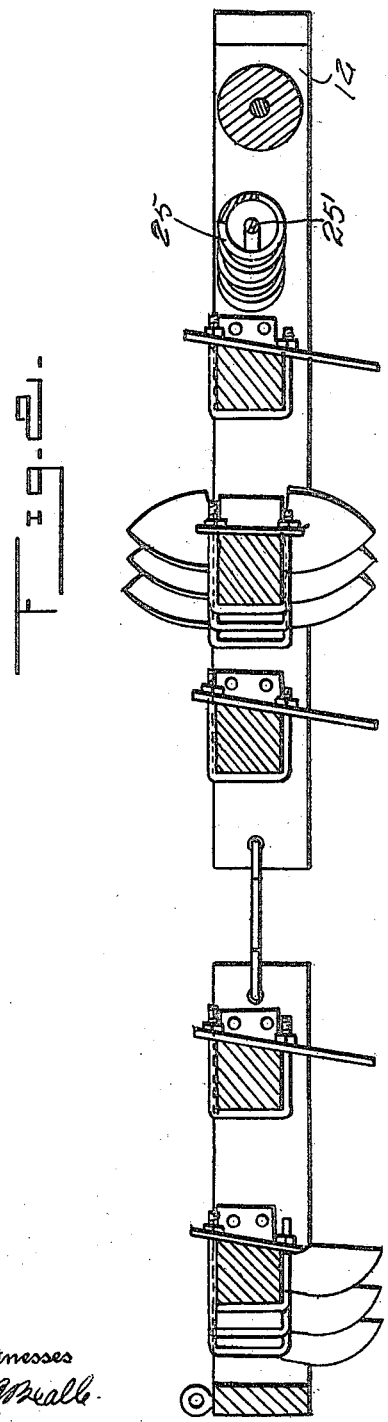

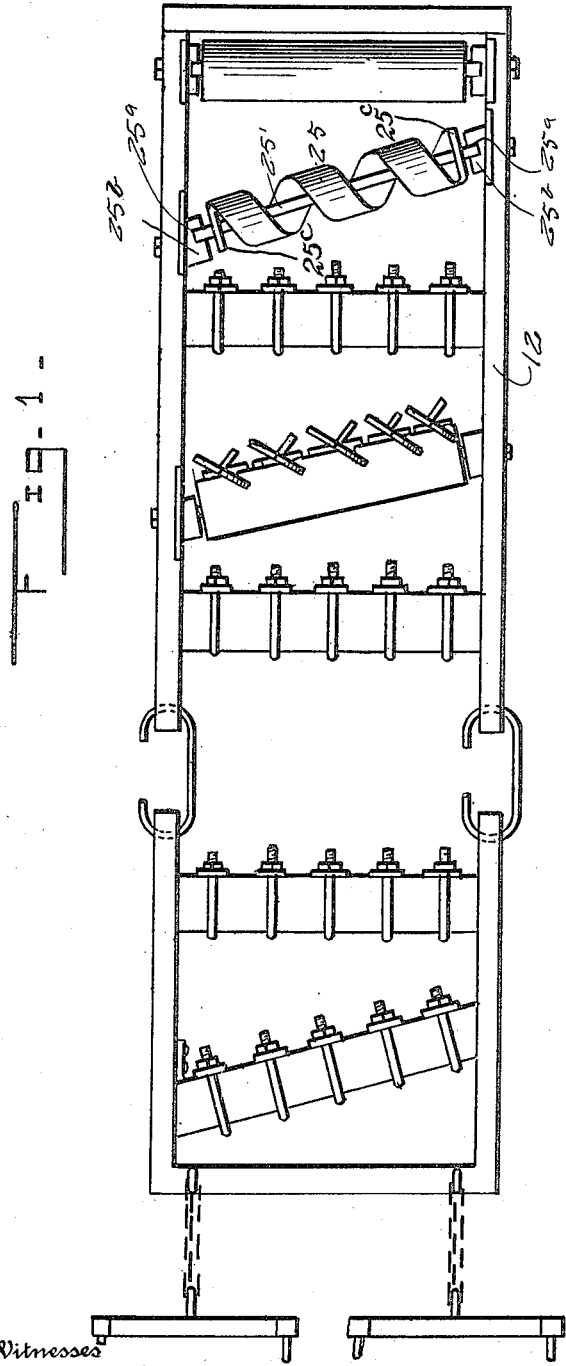

UNITED STATES PATENT OFFICE.

JAMES W. HARRIS, OF TURBEVILLE, SOUTH CAROLINA.

HARROW.

1,383,942.      Specification of Letters Patent.      Patented July 5, 1921.

Application filed March 20, 1918. Serial No. 223,560.

*To all whom it may concern:*

Be it known that I, JAMES WALTON HARRIS, a citizen of the United States, residing at Turbeville, in the county of Clarendon and State of South Carolina, have invented certain new and useful Improvements in Harrows; and I do hereby declare the following to be a full, clear, and exact description of the invention, such as will enable others skilled in the art to which it appertains to make and use the same.

This invention relates to a soil leveler and an important object is to provide a construction which has a body made in a single piece with relatively wide, spaced ground engaging convolutions.

Servient objects will appear hereinafter from the description following taken in connection with accompanying drawings wherein one embodiment is shown.

In said drawings:—

Figure 1 is a top or plan view of a harrow having my leveler applied thereto, and Fig. 2 is a longitudinal sectional view through the parts of Fig. 1.

The leveler is designated 25 and applied to a harrow of conventional design, including spaced side rails 12 between and on which the leveler is mounted.

Said leveler rests directly upon the ground and consists of a plurality of relatively wide and spaced convolutions and end portions or bearings $25^c$ which are disposed transversely of the leveler at the ends.

It will be seen that the leveling means consist essentially of a body in a single piece comprising the convolutions and end portions $25^c$.

A shaft $25'$ passes through end portions $25^c$ to mount the leveler, and the ends of said shaft are journaled in slots $25^a$ of bearings $25^b$ supported on the side rails 12.

The leveler as it passes over the soil rotates through contact therewith and due to the spaces between the corrugations acts to convey the high soil to the low places.

Changes may be made within the spirit and scope of what is claimed.

What is claimed is:

1. A soil leveler consisting of a substantially cylindrical elongated body with relatively wide convolutions in direct contact with the ground to travel thereon and with such convolutions separated to provide an intervening space.

2. A soil leveler consisting of a one-piece body with relatively wide convolutions in direct contact with the ground and with such convolutions separated to provide an intervening space, and said body having terminal portions extending across the ends of the body, and means to mount the body for rotation passing through the terminal portions.

In testimony whereof I affix my signature in presence of two witnesses.

JAMES W. HARRIS.

Witnesses:
   E. E. TIMMONS,
   BROWNIE BROWNE.